United States Patent
Srinivasan et al.

(10) Patent No.: US 7,228,326 B2
(45) Date of Patent: *Jun. 5, 2007

(54) SYSTEMS AND METHODS FOR APPLICATION DEPLOYMENT

(75) Inventors: Sriram Srinivasan, Berkeley, CA (US); Mark Spotswood, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 10/342,038

(22) Filed: Jan. 14, 2003

(65) Prior Publication Data

US 2003/0192031 A1 Oct. 9, 2003

Related U.S. Application Data

(60) Provisional application No. 60/349,436, filed on Jan. 18, 2002.

(51) Int. Cl.
*G06F 15/16* (2006.01)

(52) U.S. Cl. ............... 709/200; 709/208; 717/120; 717/123; 717/168; 379/207.02

(58) Field of Classification Search ............... 709/200, 709/208; 717/120, 123, 168–178; 379/207.02
See application file for complete search history.

(56) References Cited

U.S. PATENT DOCUMENTS

| | | | |
|---|---|---|---|
| 6,047,323 A | 4/2000 | Krausse | |
| 6,243,825 B1 | 6/2001 | Gamache et al. | |
| 6,289,393 B1 | 9/2001 | Phillips et al. | 709/315 |
| 6,345,386 B1 | 2/2002 | Delo et al. | 717/11 |
| 6,360,331 B2 | 3/2002 | Vert et al. | |
| 6,389,126 B1 * | 5/2002 | Bjornberg et al. | 379/201.03 |
| 6,418,554 B1 | 7/2002 | Delo et al. | 717/11 |
| 6,546,554 B1 | 4/2003 | Schmidt et al. | 717/176 |
| 6,973,647 B2 * | 12/2005 | Crudele et al. | 717/177 |
| 2003/0084056 A1 * | 5/2003 | DeAnna et al. | 707/100 |
| 2003/0135509 A1 * | 7/2003 | Davis et al. | 707/100 |

OTHER PUBLICATIONS

U.S. Appl. No. 09/975,590, filed Oct. 11, 2001, Dean Jacobs et al.
U.S. Appl. No. 10/341,801, filed Jan. 14, 2003, Fanshier et al.

* cited by examiner

*Primary Examiner*—Frantz B. Jean
(74) *Attorney, Agent, or Firm*—Fliesler Meyer LLP

(57) ABSTRACT

Applications can be deployed concurrently across a network cluster by utilizing a phased approach to deployment. A preparation operation is invoked each node on which an application is to be deployed. The preparation operation can utilize two phases, in which the deployment descriptors for an application are analyzed and in which each node is initialized for deployment. For each node that is successfully initialized, an activation phase is started in which the node is informed that it should prepare for requests on the application. The deployed application is then started on each successful node. For each node on which the preparation operation was unsuccessful, the deployment can be rolled back or attempted again.

19 Claims, 4 Drawing Sheets

SYSTEMS AND METHODS FOR APPLICATION DEPLOYMENT

CLAIM OF PRIORITY

This application claims priority to U.S. Provisional Patent Application No. 60/349,436, filed Jan. 18, 2002, entitled "SYSTEMS AND METHODS FOR APPLICATION DEPLOYMENT," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS REFERENCE TO RELATED PATENT DOCUMENTS

The following co-pending U.S. Patent documents are assigned to BEA Systems, Inc., the assignee of the present application, and these documents are hereby incorporated herein by reference:

U.S. Patent Application filed on Oct. 11, 2001, to Dean Jacobs et al. and entitled, "Data Replication Protocol" with U.S. application Ser. No. 09/975,590.

U.S. patent application filed on Jan. 14, 2003, to Fanshier, et al., and entitled, "Systems and Methods for Application Management and Deployment" with U.S. application Ser. No. 10/341,801.

FIELD OF THE INVENTION

The invention relates to the deployment of applications over a network.

BACKGROUND

When deploying applications in many presently available systems, there are limitations on what a user can do with an application deployment model. In some instances, applications must be completely deployed on each individual system. Further, it may not be possible to deploy multiple applications at the same time. The deployment of applications also creates potential problems in areas such as managing files and events for these applications. This problem is exacerbated when different applications are being concurrently deployed across the system.

BRIEF SUMMARY

Systems and methods in accordance with one embodiment of the present invention can provide for the deployment of an application, or applications, concurrently across one or more nodes or servers, either on a network or in a cluster. A preparation operation can be invoked on at least one application container that can be used for each node on which the application is to be deployed. The preparation operation can utilize two phases, such as an "init" phase in which the deployment descriptors for an application are analyzed and a "prepare" phase in which each node is initialized for deployment.

For each node that is successfully initialized, an activation phase can be started in which the node is first informed that the node should prepare for requests on the application. The deployed application can then be started on each successful node. For each node on which the preparation operation was unsuccessful, the deployment can be rolled back or attempted again.

Other features, aspects, and objects of the invention can be obtained from a review of the specification, the figures, and the claims.

DETAILED DESCRIPTION

Systems and methods in accordance with one embodiment of the present invention can utilize a phased approach to deployment. The deployment of an application can happen in at least two phases, referred to in this embodiment as a "preparation" phase and an "activation" phase. This is similar to a two-phase approach for transactions, such as is described in U.S. patent application Ser. No. 09/975,590 entitled "Data Replication Protocol". A system administration component can drive the deployment across a domain, cluster, or network, for example.

Such a component can invoke a preparation operation on an application container for network or cluster nodes on which the application is to be deployed. The preparation of these nodes can either succeed, fail, or in some cases partially succeed. The preparation can also succeed on some nodes and fail on others. A system administration component can be used to control whether or not the deployment continues if the deployment fails for any of the nodes.

One of the problems overcome by systems in accordance with the present invention involves heterogeneous deployments, or concurrent deployments of different applications. In such a situation, different nodes can end up with different versions or packages of software when some deployments succeed on some nodes but fail on others. While it may be desirable in some situations to allow for partial deployments, there can be a need to ensure consistency between the nodes.

To achieve such consistency, a system can go through the preparation phase to attempt to initialize an application on the nodes on which the application is to be deployed. Then, based on the results, the decision can be made to either begin activation or roll back the preparation.

The application container can break the preparation and activation phases down into additional phases for various modules within an application. This breakdown is shown, for example, in FIG. 2. For instance, the preparation phase 200 can be broken down into two phases, such as "init" 202 and "prepare" 204. The init phase 202 can involve the reading of the application descriptors. If the application descriptors are adequate, the prepare phase 204 can begin in which the application will actually be initialized.

One reason to break down the preparation phase is that there may be modules with interdependencies. While these interdependent modules are initializing, they can still require access to the descriptors for the other modules. The init phase can be used to read the module descriptors and make the descriptors available to the rest of the modules in the application.

Figure 2:
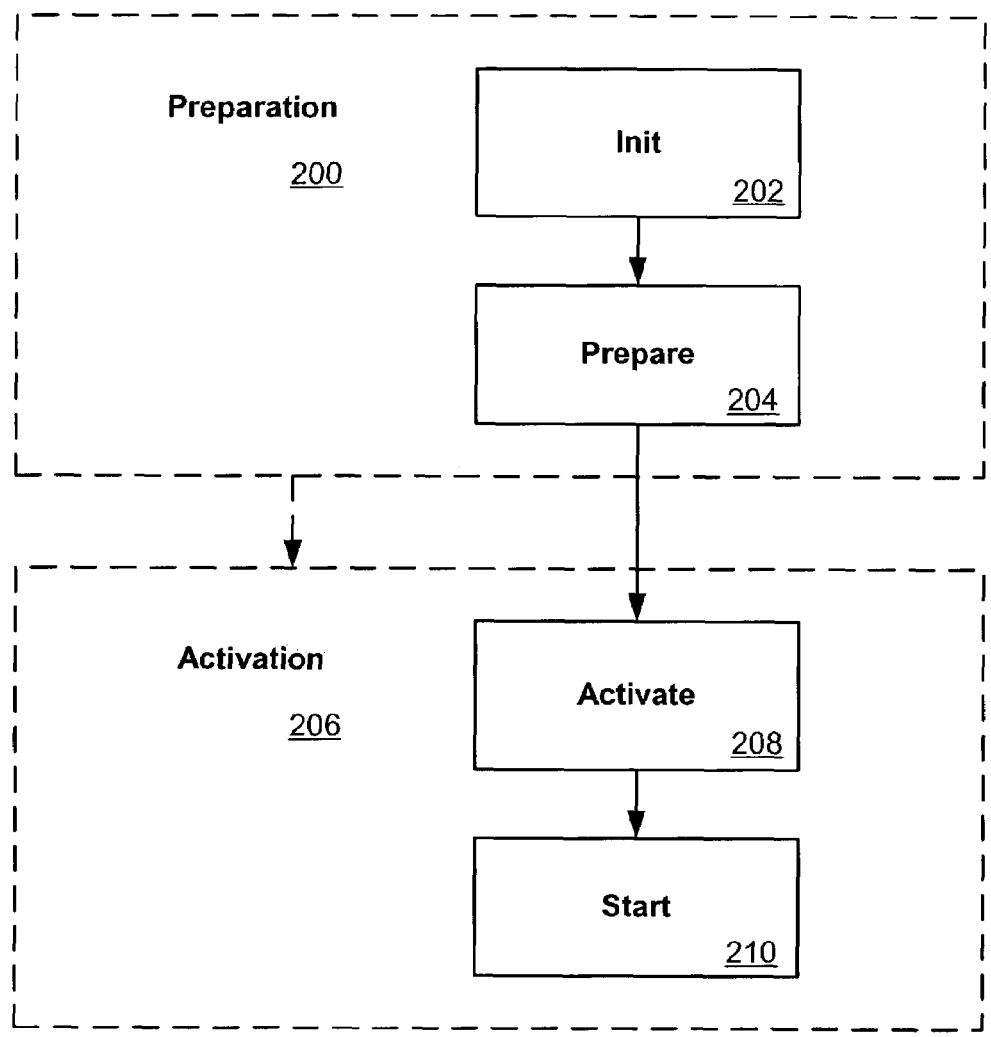
FIG. 2 is a diagram showing phases that can be used with the system of FIG. 1.

The activation phase 206 can also be broken down into two sub-phases, such as an "activate" phase 208 and a "start" phase 210. The activate phase 208 for a module can be used to inform the module that it should be ready to receive input or requests. The start phase 210 can be used to actually start any actions required for the deployment. As seen in FIG. 2, a system can use the two-phase approach, as well as a four-phase approach using the sub phases for both the preparation phase and the activation phase. Also, a combination of approaches may be used, in which only the preparation or only the activation phase is broken down into sub-phases.

When undergoing a phase change, such as from the preparation phase to the activation phase, the application directories can be switched as well. One approach to switching directories during phase change can "stage" an active directory. If a user is doing updates, for example, the user may need separate directories into which the updates can be staged before the changes go active. This can allow a user to have side-by-side updates of an application.

A class loader can also be switched, in addition to the directory. A class loader is an object that can be used by Java to store class definitions for an object. Applications can run in a Java class loader of a system class loader. The Java class loader can be switched when going from stage to active, for example, to allow two versions of the application to run at the same time. There can be one application running and one application to which the system can switch when the application is updated.

Figure 1:
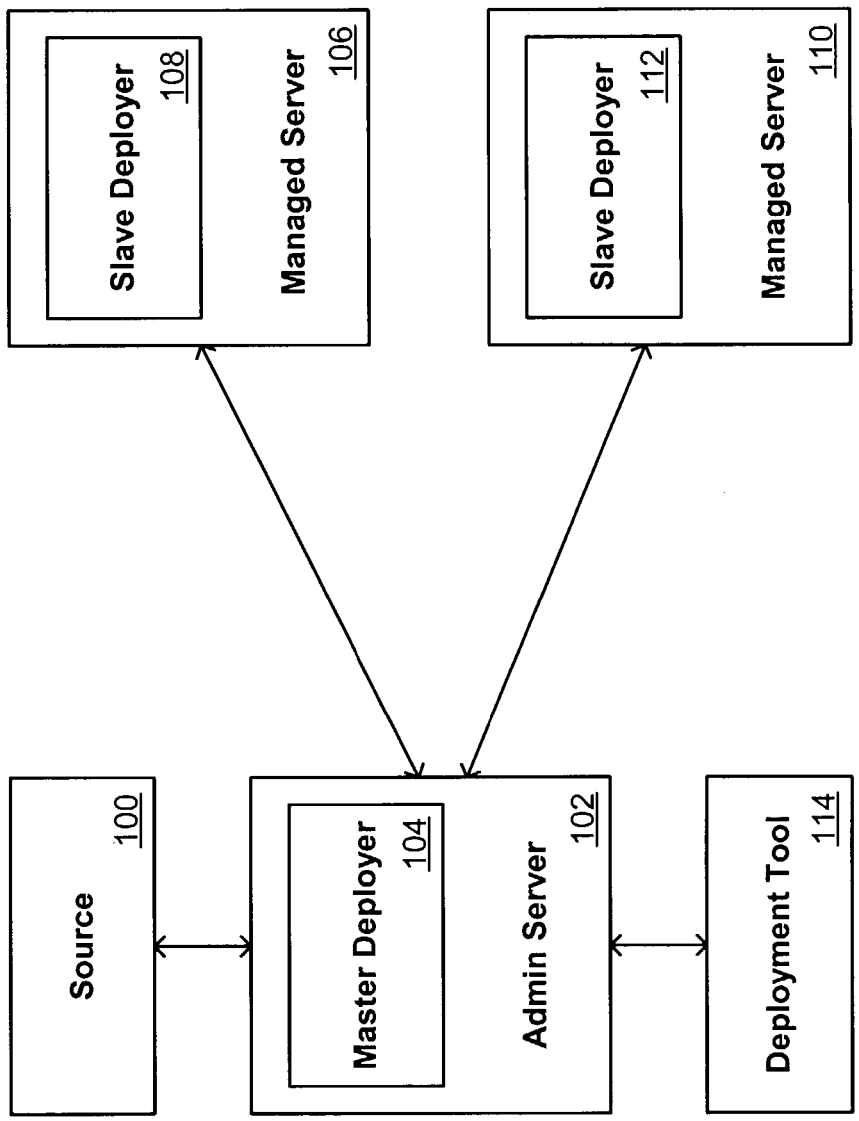
FIG. 1 is a diagram of a system in accordance with one embodiment of the present invention.

In one embodiment, such as the system shown in FIG. 1, a deployment tool 114, such as a standalone application or an administration console, can contact a master deployer 104 in the administration server 102 and point it to the source 100 of an application archive file or directory. The master deployer 104 can send this path to slave deployers 108, 112 in any relevant managed servers 106, 110. A slave deployer can pull the file into a staging directory, explode the archive, and attempt to load the archive. This is an implementation of the "preparation" phase, which in this implementation can be thought of as a "load-and-validate" phase. Slave deployers can inform the master deployer about the success of the load. If every managed server reports a successful load, the master deployer can direct all relevant slaves to activate the installation. The slave deployers can copy or move the files from their staging to the production directories. The newly deployed application can then start accepting client requests.

There can be many degrees of freedom in the above system, which can allow the system to address the varied needs of users or applications such as developers, large-scale deployments, and content-management systems. For example, a sourcePath directive, if left unspecified, can implicitly point back to an administration ("admin") server to mimic a scheme of file distribution where the admin server supplies the files. If specified, the sourcePath can also point to a shared directory or a local directory per server.

During development, unnecessary copying can be eliminated by configuring the sourcePath, the staging directory, and the production directory to point to the same path. In addition, the servers can be explicitly instructed, such as through configuration, to avoid managing files. For large-scale deployments with identically configured servers, one staging directory can be shared between all servers, as well as a single production directory. This can allow files to be managed externally, such that the servers are told to avoid copying any files.

A deployer can enumerate a subset of files that have changed, such that it is up to the various containers in the managed servers to react to the change by, for example, updating class loaders, copying files, renaming files, or invalidating data caches. To make matters more simple, a deployer can even choose to supply wildcards instead of enumerating files.

An ".ear" file can be used as the basic unit of deployment. An .ear file is an Enterprise Archive file that can contain information necessary to deploy an enterprise application on an application server. An .ear file can contain both a ".war" or web archive file that contains the web component of the application, as well as a .jar (Java archive) file. There can also be some deployment descriptor files in XML. A tool can wrap a "raw" EJB or web application into its own .ear file using the name of the jar itself. A deployment tool can accept a file system path of the archive file. To redeploy a small subset of the files, a tool can also accept the names or wild-card patterns of the specific files that were touched.

A Java-based deployment tool can be supplied that provides a command-line and equivalent Java interface, such as where the command-line is merely a main( ) routine wrapped around a public Java interface. Much of this functionality, except for example the user-interface layer, can live in an admin server to allow a common code base between a command-line tool and the console. An example of a deploy tool command-line structure is as follows:

```
java weblogic.deploy
    Admin server directives
    -adminurl      <admin server url>
    [-user         <admin user name.         Default: "system"]
    [-password     <admin password.          Default prompt at run-
                                              time]
    Deployment Directives
    -file          <name of ear file>
    [-sourceDir    <directory where the deployment lives>
                                              Default: Infer from -file,
                                              If absolute path. If relative
                                              p a t h, u s e
                                              <adminURL>/applications]
    [-type         <ear | war | rar>Default: Look at the suffix first,
                                              then at the structure of the
                                              contents]
    [-delta        <comma-separated wild-card specification]
    [-name <application name.     Default: extract from -file>]
    [-targets      <[component1@server1,server2;component2@...]>.
                   <server1,server2,...>
                                              Default: all servers]
    Task management options
    [-id           <deployment ID>]
    [-prepare]
    [-activate]
    [-deactivate]
    [-cancel]
    [-remove]
    [-query]
    [-list]
    Automatic polling
    [-poll]                                   Default: no polling
    [-pollInterval] <seconds>                 Default: 5
```

Switches can be case sensitive, and can be spelled out just enough to make them unique. For example, "-l" can be used for "list", and "-ad" for "-adminurl".

An "-adminURL" option can use the http or https protocol, for example, and can allow a deploy tool to communicate with an admin server. It will not necessarily convey the location of the application archive file, as the sourceDir can be used for that purpose.

A "-file" directive can specify the name of the archive file or directory to deploy. If a directory is deployed, the directory must have the same structure as the corresponding archive file. The filename can be an absolute or relative path name.

A "-sourceDir" option can be given to the managed server to specify the directory where the archive is present. If the -sourceDir option is not present, it can be inferred. If the -file option contains a absolute path, the -sourceDir can be clear from the filename. If -file contains a relative path, the managed server can ask the admin server for the file and the admin server can look under its applications directory for the filename. In some embodiments, -sourceDir is implemented from the point of view of the managed server, such that the server pulls the file. In this case, it is not implemented from the point of view of the deploy tool. The ability of the tool to see the file does not necessarily mean that the managed servers can see the file using the same path.

A "-type" option can be used to specify the type of archive file or directory. In the absence of this option, an admin server can infer the file from the suffix, such as ".ear", and by examining the archive file or the structure of the directory.

A "-delta" option can be used to tell the managed server which files have actually changed. This option can be a comma-separated list of file names and wild-card patterns. This option can be ignored if the admin server has not previously seen this ear file. The deploy tool may not supply the information regarding what is to be done with the files.

A "-name" option can be used to supply the application name, in case there are multiple applications configured with the same ear filename. In such a situation, it can be considered an error not to provide such a name. If different applications have different archive files, the name of the archive can derive the application name by default.

A "-targets" option can be used to accept a comma-separated list of server or cluster names, which can apply to any component in the application. This option can be used to target different components in an application to different servers. Each target can be separated by a semi-colon. If the application has been configured before, this list can replace the original list of targets. Otherwise, it can create a new application MBean and allow any server in the domain to be a target. This can ease development as it is not necessary to configure an application before the application is deployed.

Options such as "-prepare" and "-activate" can allow a deployer to manually handle the installation and activation phases of deployment. A user-supplied string identifier, such as a deployment ID, can be supplied with "-id" to identify a particular deployment task that can be used to remove, activate, or query the status of that task. The identifier can be unique, can be one that the admin server has not encountered, or one for which the prepare command has been rejected. Internally, this identifier can be used in communications between the admin and the managed servers to convey the status of a particular deployment. If these options are absent, the master deployer in the admin server can drive the two-phase deployment automatically, such as with an internally generated ID.

One example of a way to take advantage of these embodiments is to prepare a deployment on a large number of servers, which can take a substantial amount of time, and activate the deployment at 9:00 on Monday morning. Another way would involve preparing a deployment on just one server, then activating it to a number of servers by modifying the -targets list. The activate phase can implicitly handle the prepare phase if it is not done already.

A "-poll" option can be used to tell a deploy tool to periodically scan the source directory itself, if provided or capable of being inferred, and can issue the deploy command when some archive is touched or introduced. This option can be used to mimic the behavior of an admin server. New or updated archive files can be noticed and automatically deployed in their entirety. Changes to specific files within the archive may not be noticed. In some embodiments, the -poll option cannot be used with task management options such as -prepare and -activate.

A console can support the same functionality as the deploy tool. The console can allow the deployer to submit new or updated applications and to query the status and remove pending deployments. Any other tool can use the deploy tool's published interfaces, such as the command-line or Java interfaces.

File Management

Each managed server can be aware of, and can have at least some knowledge about, a staging directory and/or a production directory. A staging directory can be used to store files that are being tested. When an activate command is issued by a master deployer, such as in an admin server, the files can be copied over to a production directory, or renamed if possible, and the appropriate class loaders can be notified of the change. This can allow the classloaders to look at the production directory in the future without having to unload any of the files that might have been loaded earlier, such as in the prepare phase.

Many choices can be made available to a deployer, such as through server configuration options or server MBean ("ServerMBean") properties. For instance, directories can be specified using stagingDirectoryName and production-DirectoryName. These directories can utilize the same path, which can avoid the need for copying, but such a configuration may be useful only during development time, since it may not be possible to undo a write file. These directories can also be shared with other managed servers as well as an admin server, but this may be known only to the deployer. Sharing may not be explicitly indicated to the server.

Boolean flags such as autoCopyFromSourceToStaging and autoCopyFromStagingToProduction can be used to tell a managed server to copy from the source directory to a staging directory before the preparation phase, and from staging to production before the activation phase. Some of these copies can be avoided if the directories are the same, or if a prepare is omitted and the activate is issued directly, such that there is no need to copy into the staging area first. These flags can be turned off if the staging and production areas are shared, to avoid having the managed servers stepping on each other's files. In this case, the deployer can assume the responsibility of copying the files over through external means.

It can be expected that all archives are exploded recursively in the staging and production areas, regardless of who manages the files and moves or copies them between the different areas. This can allow the application to be incrementally updated. A few files can be touched without having to worry about jar files being kept locked and rendered inaccessible. When an archive is exploded, the containing directory can be given the name of the archive itself, such as to preserve the structure. For example, an archive file foo.ear can become a directory staging/foo.ear. If foo.ear contains baz.war, this can get exploded into the directory staging/foo.ear/baz.war.

Deployment States

When an application is initially deployed, the application can go from an undeployed state, through a prepared state, and into an activated state. This can be more complicated in a redeployment or update scenario. In this case, the application can have one version in production and a newer version in staging getting ready for production. The constraints can be that both versions are not in production at the same time, nor in a prepared state at the same time.

Figure 3:
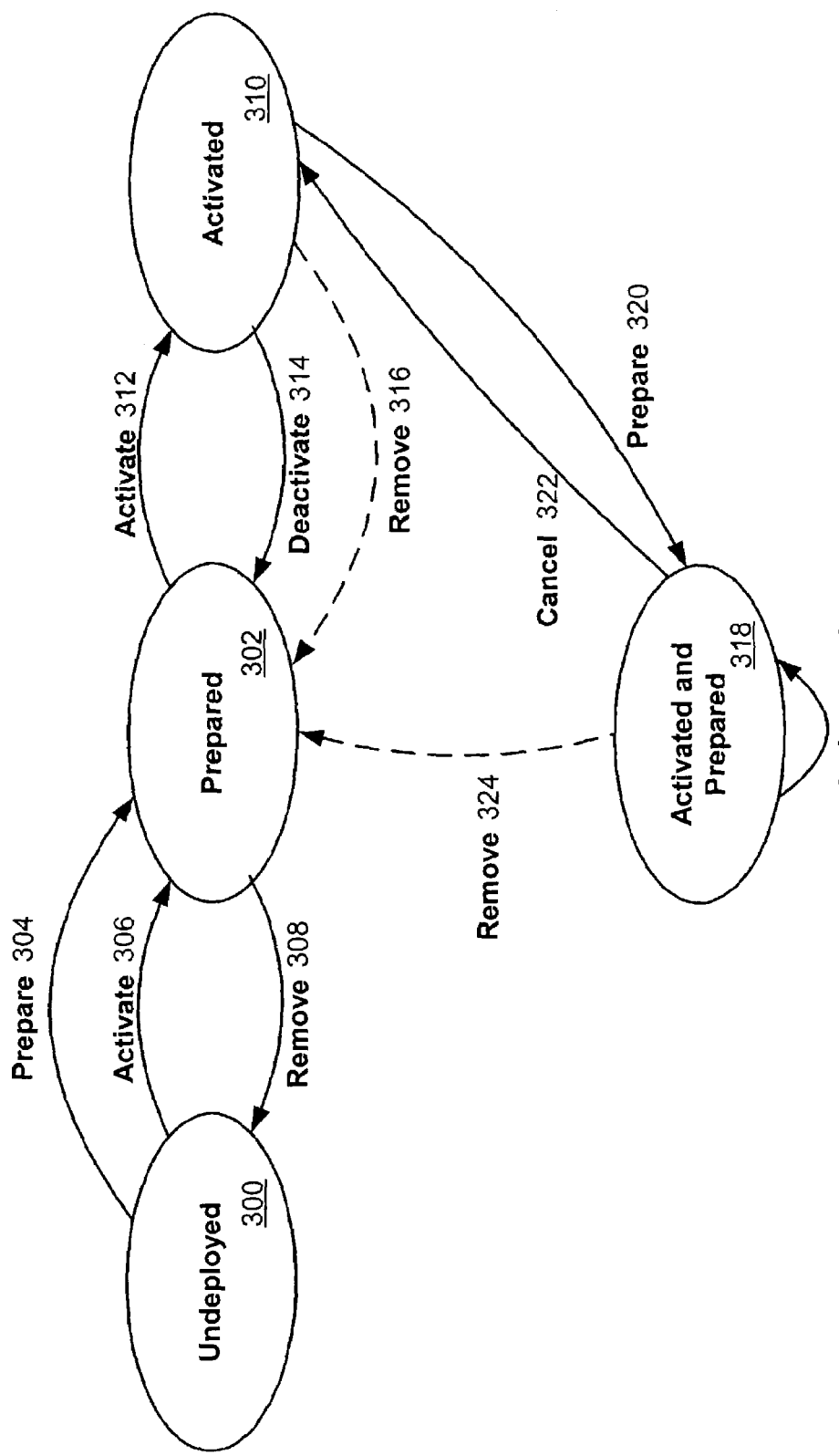
FIG. 3 is a phase diagram showing phases that each managed server in FIG. 1 can undergo in accordance with one embodiment.
Figure 4:
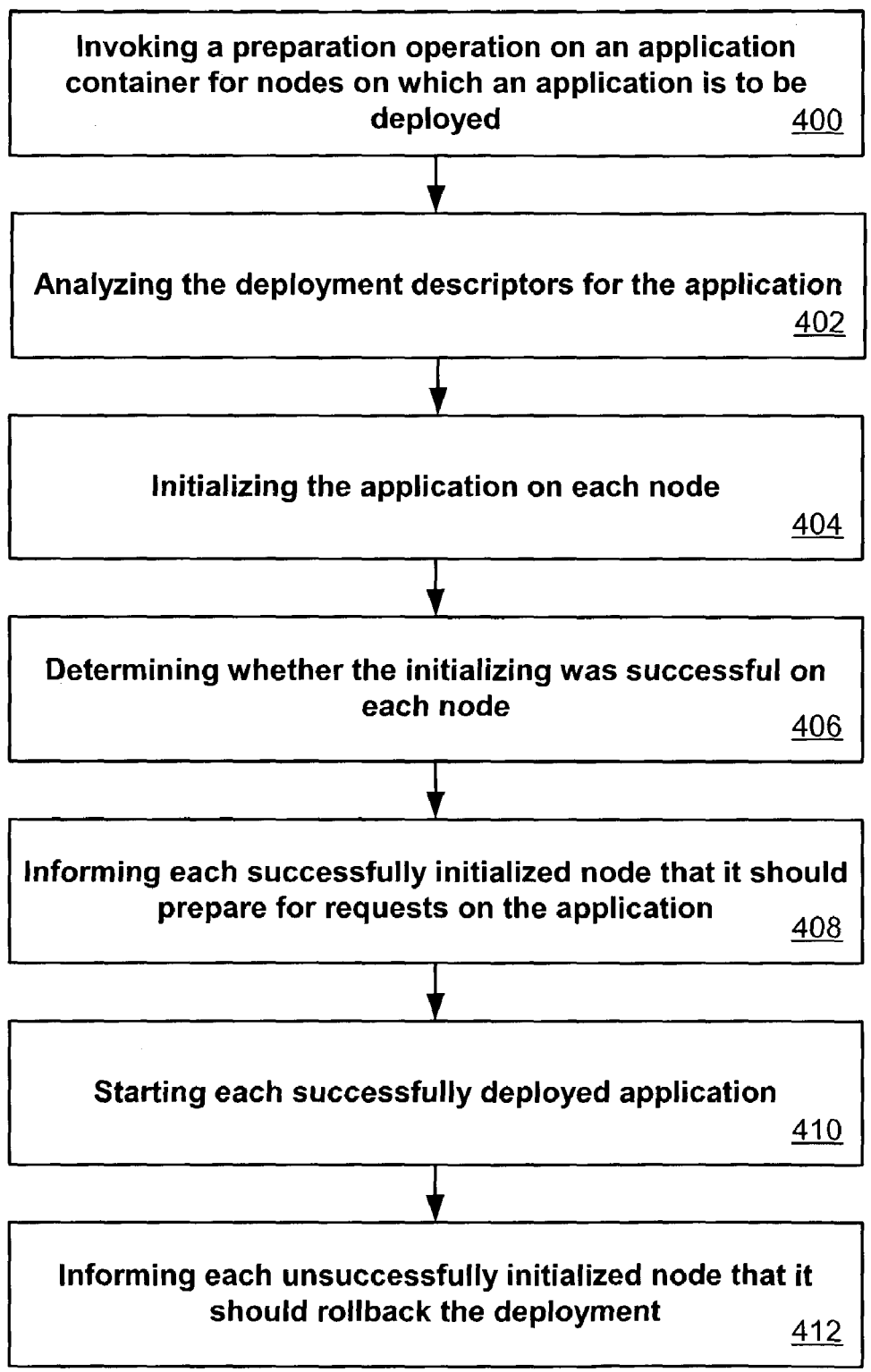
FIG. 4 is a flowchart showing the steps of a method that can be used with the system of FIG. 1.

FIG. 3 shows state transitions that an application can undergo in accordance with one embodiment of the present invention. The application can be in one of three states shown when there is only one deployment: undeployed 300, prepared 302, and activated 310. The state labeled "Activated and Prepared" 318 indicates that the application has one active deployment and another that has been prepared to take over. There is a state transition from state 318 unto itself, such as upon an activate notification 326, which can remove the currently activated deployment and replace it with a newly staged deployment.

When the application is undeployed 300, it can undergo a prepare operation 304 to go to a prepared state 302, or can go to the prepared state 302 through an implicit prepare when receiving an activate operation 306. An application in a prepared state 302 can undergo a remove operation 308 and return to the undeployed state 300. An application in the prepared state 302 can undergo an activate operation 312 to transition to an activated state 310. An application in an activated state 310 can undergo a deactivate operation 314 or a remove operation 316. Deactivate can cause the application to revert to a prepared state 302. Remove can continue on through the prepared phase 302 until the application is undeployed 300. In certain instances, an activated phase 310 can undergo a prepare operation 320 which will place the application in the activated and prepared phase 318 mentioned above, which can undergo an activate operation 326 on itself. This application state can also undergo a cancel 322 or remove 324 operation.

A prepare notification can be issued by the deploy tool through the master deployer. The command can be accompanied by, for example, a source directory path, an optional delta specification, and a deployment id.

A slave developer can copy the appropriate files into the staging directory, taking wildcards into account. The slave developer can call all internally-registered observers with a list of files or pattern. This list of observers can include the EJB and web containers, and possibly the application itself. The containers can be responsible for identifying whether new classloaders are needed, or whether existing ones need to be bumped.

In certain systems, there can be one classloader per .ear file and one sub-classloader for each web application. Each JSP (Java Server Page) can be in its own classloader, which can in turn be a child of the web application classloader. If a class file is part of the delta specification, the slave developer can easily figure out, from the application name, which EAR classloader is affected. Similarly, if a JSP changes, it can be narrowed down to the appropriate JSP classloader. If a utility class loaded by the web application classloader is modified, the web application classloader can be marked for reloading. All other files can be assumed to trigger no classloader changes.

Once all containers have been notified, a new set of classloaders can exist if one or more class files have been updated. These containers can be given a chance to validate the new set of classes. Web applications may not need to do anything, while the EJB container can look for potential JNDI conflicts and verify that CMP beans and the corresponding database tables are fine.

Once the deployment has been prepared, the managed server may still have several old classloaders serving out application requests. The managed server may can also have a new set of classloaders and EJB homes that have validated the new installation in the staging directory. At this point, the slave developer can respond to the master deployer with the status of the prepare phase.

A master deployer can wait for all relevant managed servers to respond to a prepare message. If these managed servers do not respond in time, the master deployer can issue a cancel command to the servers. The deployer can also choose a different deployment policy for using prepare and activate commands, such as one that would find a deployment acceptable if a majority of the targets are able to prepare successfully.

When all slave deployers respond with a "prepare successful" or equivalent message, the master deployer can issue an activate command. The activate command can actually be a "prepare and activate" command. If a deployment has not been prepared, the deployment can go through an implicit prepare stage. The activation phase may not be automatically triggered if the deploy tool has been called with only the—prepare option.

Depending on the extent of the change, the containers can decide to assimilate the changes directly into the already active deployment. If any classes have changed, the corresponding classloaders can get bumped. In this case, the active deployment can be deactivated first. This can involve such tasks as unbinding JNDI and web contexts, as well as getting a serialized snapshot of all session states to feed the new deployment. The files can then be copied or renamed over to the production directory, and the containers can be informed of the change. The classloaders can be made to point to the production directory. Classes that were loaded from the staging directory during prepare may not need to be touched, while newer ones can be loaded from the production directory. The web classloader can also be told about the new context root and fed the serialized session state. All containers can get rid of the older classloaders, such as those for which replacements have been identified, and can advertise the new deployment publicly. EJBs can advertise themselves on JNDI, and the new web applications can register their new context root.

A cancel notification can dispose of a prepared deployment, if any, as well as any corresponding files in the staging directory. A cancel notification cannot cancel an active deployment in some embodiments, which can require active deployments to be removed.

A deactivate notification can be used to move the deployment from an active state to a prepared state. This can work in some embodiments only if the system has exactly one deployment that is in an active state. If the system has one deployment in production and another in staging, the command will fail even if it contains the correct deployment id. This can prevent two deployments of the same application in a "prepared" state.

In one situation that can occur without the system having exactly one deployment in an active state, a user can activate deployment 1 and prepare deployment 2. The user can also deactivate 1 and activate 2. Files corresponding to 2 are then copied over from the staging directory to the production directory. Deployment 1 cannot be activated again because its files have been overwritten. A fundamental constraint in one embodiment is that files only move in one direction, from staging to production, without the possibility of undo. This can be true of MBeans as well.

A remove command or notification can be implemented to remove all deployments, whether activated or prepared. The command can be a "deactivate and remove" command, either implicit or explicit. Both production and staging directories can be purged of this deployment's files.

The use of phased deployment phases can also be useful, for example, in handling message-driven Enterprise Java-Beans (EJBs). A message-driven EJB can invoke on a second EJB. If the second EJB is completely initialized in one phase, the message-driven EJB can get something from the queue and try to invoke on an EJB that is uninitialized in the application.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A system for deploying applications, comprising:
 a data storage component containing at least one application to be deployed;
 a managed component receiving the application from the data storage component and executing the application;
 an administration component for deploying the application from the data storage component to the managed component, the managed component to prepare the application for deployment and activate the application after it is deployed; and
 the administration component comprises a master deployer and the managed component has a slave deployer, the master deployer to send deployment information to the slave deployer and the slave deployer to manage the deployment on the managed component, the slave deployer further to notify the administration component of the success of the deployment on the managed component.

2. A system according to claim 1, further comprising:
 a deployment tool for guiding the deployment of the application.

3. A system according to claim 1, further comprising:
 additional managed components for receiving and executing the application.

4. A system according to claim 1, further comprising:
 additional managed components for receiving and executing the application, the administration component further to deploy the application to the additional managed components.

5. A system according to claim 1, further comprising:
 a staging directory that can be shared by the managed component and any other managed component to receive the deployment, the staging directory holding the application until activated by the administration component.

6. A system according to claim 1, further comprising:
 a production directory in communication with the managed server, the production directory to hold the deployed application for the managed server.

7. A method for deploying an application, comprising:
 invoking a preparation operation on the application at a node on which the application is to be deployed, wherein the node is different from the one on which the application is originated;
 activating the deployed application on the node;
 invoking the preparation operation for additional nodes on which the application is to be deployed; and
 canceling the deployment if the preparation operation is not successful on any of the nodes.

8. A method according to claim 7, further comprising:
 determining whether the preparation operation has succeeded before activating the deployed application.

9. A method according to claim 7, further comprising:
 activating the deployed application on the additional nodes.

10. A method according to claim 7, further comprising:
 activating the deployed application on any nodes for which the preparation operation was successful.

11. A method according to claim 7, further comprising:
 canceling the deployment if the preparation operation is not successful.

12. A method according to claim 7, further comprising:
 continuing the deployment if the preparation operation is not successful on all of the nodes.

13. A method according to claim 7, further comprising:
 invoking a preparation operation on an application container for a second node on which a second application is to be deployed.

14. A method according to claim 13, further comprising:
 activating the second application on the second node.

15. A method according to claim 7, wherein:
 invoking a preparation operation further comprises executing an init phase in which a deployment descriptors is analyzed, and executing a prepare phase in which the application is initialized.

16. A method according to claim 7, wherein:
 activating the deployed application on the node further comprises executing an activate phase in which the node is informed it should prepare for requests on the application, and executing a start phase in which the application is actually deployed and executable on the node.

17. A method according to claim 7, further comprising:
 switching application directories from a staging directory to a production directory when deploying an application.

18. A method according to claim 7, further comprising:
 switching a class loader when deploying an application.

19. A method according to claim 7, wherein:
 the deployed application can be activated on the node using an implicit preparation operation if the preparation operation is not successful.

* * * * *